United States Patent [19]

Phillips et al.

[11] 4,102,636
[45] Jul. 25, 1978

[54] FURNACE WITH HEAT EXCHANGER FLOW CONTROL

[75] Inventors: William A. Phillips, Comstock Park; David R. Dietz, Grand Rapids, both of Mich.

[73] Assignee: Granco Equipment, Inc., Grand Rapids, Mich.

[21] Appl. No.: 747,392

[22] Filed: Dec. 3, 1976

[51] Int. Cl.² ............................................. F28D 19/00
[52] U.S. Cl. ........................................ 432/30; 165/7; 432/39; 432/180
[58] Field of Search ............... 165/4, 7, 5; 432/30, 432/39, 180

[56] References Cited

U.S. PATENT DOCUMENTS

| | | | |
|---|---|---|---|
| 1,921,507 | 8/1933 | Culbertson | 432/39 |
| 3,918,373 | 11/1975 | Fritz | 165/7 X |
| 4,022,571 | 5/1977 | Gentry et al. | 432/180 |

FOREIGN PATENT DOCUMENTS 1,097,461  1/1961  Fed. Rep. of Germany ........... 165/5

*Primary Examiner*—Albert W. Davis, Jr.
*Attorney, Agent, or Firm*—McGarry & Waters

[57] ABSTRACT

An industrial heating furnace wherein hot exhaust gases from the furnace are heat exchanged in a rotary ceramic heat exchanger with air which is supplied to burners in the furnace for combustion air. The temperature of the gases within the furnace is controlled and the ratio of the flow of gases through the two sides of the rotary heat exchanger is controlled at a predetermined value which is approximately one to maximize efficiency of the furnace operation and to minimize thermal stresses on the ceramic heat exchanger.

13 Claims, 1 Drawing Figure

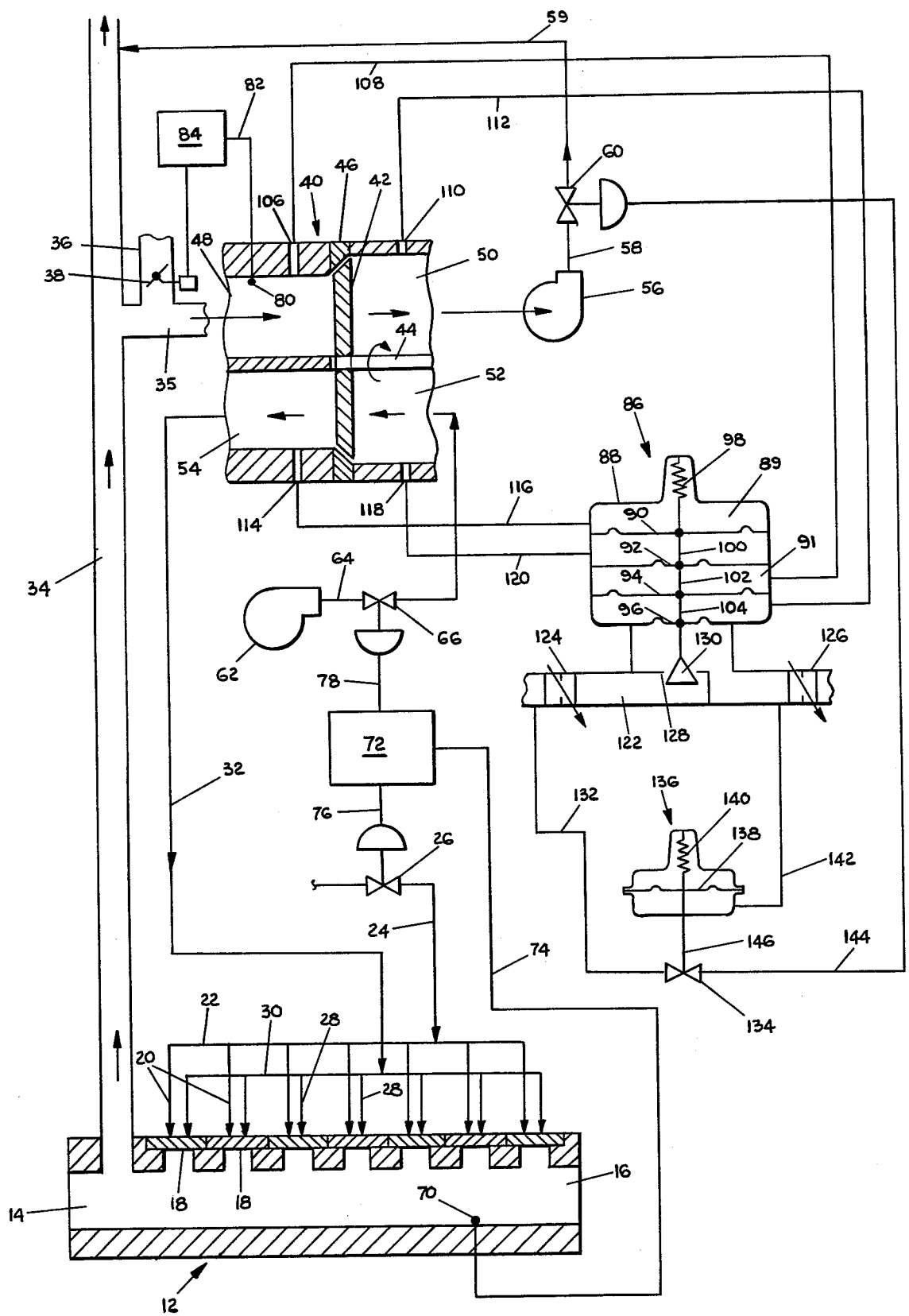

FURNACE WITH HEAT EXCHANGER FLOW CONTROL

BACKGROUND OF THE INVENTION

1. Field of the Invention

This invention relates to heating furnaces. In one of its aspects, the invention relates to a method and apparatus for controlling the flow of gases through two sides of a ceramic heat exchanger which is used in conjunction with an industrial heating furnace.

2. State of the Prior Art

Industrial heating furnaces are used for heating billets, for drying paint and solvents from lithograph sheets and for many other processes. In these types of operations, the articles are usually passed through the furnace from an entrance end to an exit end. As the articles pass through the furnace they are subjected to heated air which raises the temperature of the articles to a desired temperature. Typically, the heat is supplied through burners which burn fuel with preheated air. It has recently been disclosed in copending U.S. Pat. application Ser. No. 621,302 filed Oct. 10, 1975, now U.S. pat. No. 4,022,571, to heat exchange the hot exhaust gases from the furnace with incoming air by means of a rotary ceramic heat exchanger.

The heat requirements for the furnace change from time to time. For example, sometimes the industrial line is closed down temporarily and the flow of articles through the furnace ceases. Under such conditions, the heat requirements to the furnace are drastically diminished. In order to prevent overheating, the heat supplied to the furnace is decreased to maintain the temperature within predetermined limits. In order to decrease the heat supplied, the air and fuel supplied to the burners are decreased.

The decrease in the supply of air to the furnace causes a change in the amount of air passed through the heat exchanger. With less air flowing through the heat exchanger, the ceramic heat exchanger is subjected to greater thermal gradients and thermal cycles which deleteriously affect the life of the ceramic heat exchanger. It is thus desirable to maintain the thermal gradient across the heat exchanger as constant as possible and to minimize cyclical thermal fluctuations in the heat exchanger.

SUMMARY OF THE INVENTION

According to the invention, the ratio of flow of gases through a first side of a rotary ceramic heat exchanger to the flow of gases through a second side of the rotary ceramic heat exchanger is maintained at a predetermined value to balance the heat flow to a furnace. Heated air is obtained from the heat exchanger and supplied to the furnace. Hot exhaust gases are removed from the furnace and passed through the first side of the rotary ceramic heat exchanger for recovering the heat therein. The temperature of the furnace is maintained and the flow of the hot gases to the furnace from the rotary ceramic heat exchanger is varied to meet the temperature requirements of the furnace. Thus, the exhaust gases from the furnace are controlled in order to maintain the ratio of flow of gases through the two sides of the furnace at a predetermined value.

Typically, the gas flow through the two sides of the rotary ceramic heat exchanger is measured by detecting the pressure drop across the ceramic heat exchanger wheel in each stream of gas. However, other types of pressure sensing devices can also be used within the scope of the invention. The ratio of the pressure drops across the two sides of the rotary heat exchanger is detected and the flow of gases across the first side of the heat exchanger wheel is controlled to maintain the ratio at the predetermined value.

Desirably, the control means for maintaining the ratio has means for adjusting the ratio so that different conditions in the furnace can be met.

Typically, the furnace will be of the type in which the heated air obtained from the heat exchanger is supplied to a burner wherein it is admixed with fuel and used as combustion air for the fuel.

Also according to the invention, there is provided a method for heating articles in a furnace zone wherein heated gases are supplied to the zone and heated exhaust gases are removed from the heating zone. The heated exhaust gases are passed through one side of a rotary ceramic heat exchanger and air is passed through a second side of a rotary ceramic heat exchanger. The heated air is passed to the furnace to heat the articles therein. The temperature of the gases in the furnace is controlled to maintain the temperature therein within predetermined limits. The ratio of the flow of gases across the first side of the rotating heat exchanger to that of the second side of the rotating heat exchanger is maintained at a predetermined value. The ratio can vary over a wide range depending on the process requirements but generally is maintained at about one with a slight preference to slightly greater than one so that the heated exhaust gases exceed the air supplied to the furnace. In this manner, a negative pressure is maintained within the furnace. Alternately, a positive pressure can be maintained in the furnace in which case the ratio would be less than one.

BRIEF DESCRIPTION OF THE DRAWINGS

The invention will now be described with reference to the accompanying drawing which shows a furnace having a pressure control system according to the invention.

DESCRIPTION OF THE PREFERRED EMBODIMENT

Referring now to the drawing, there is shown a heating furnace 12 having an entrance end 14 and an exit end 16. Burners 18 are positioned along the side of the furnace to heat articles which pass from the entrance to the exit end of the furnace. Fuel is supplied to the burners through fuel pipes 20, header pipe 22 and a fuel supply line 24. The flow of fuel through the fuel supply line 24 is controlled by a control valve 26. Conventional means (not shown) are provided for moving the articles from the entrance end to the exit end of the furnace. An example of suitable means is disclosed in the U.S. Pat. No. 3,484,086 to Gentry et al., issued Dec. 16, 1969.

Heated air is supplied to the burners 18 through heated air supply lines 28, heated air header pipe 30 and a heated air supply conduit 32. An exhaust conduit 34 with branch line 35 removes the heated gases from the furnace. An air inlet pipe 36 is provided in the branch line 35 to add make-up air to the branch line 35 and thereby cool the air therein as desired. The amount of air added to the branch line 35 through the air inlet pipe 36 is controlled by a damper valve 38. The furnace is of the type wherein articles, such as billets are heated as they pass from the entrance end 14 to the exit end 16 thereof. An example of such a furnace is described more fully in U.S. Pat. 3,409,217, issued Nov. 5, 1968, and U.S. Pat. No. 3,837,794 issued Sept. 24, 1974, both of which are incorporated herein by reference.

A rotary ceramic heat exchange assembly 40 is provided for heat exchanging the exhaust gases with the make-up air for the furnace. The heat exchange assembly is shown schematically and includes a rotary ceramic heat exchanger wheel 42 mounted for rotation about a shaft 44. An annular seal 46 is provided around the wheel to form a gap seal therewith. Desirably, the annular seal member 46 and the rotary ceramic wheel 42 are axially tapered as illustrated. This axially tapered seal structure is disclosed and claimed in the United States patent to Gentry, 3,942,953, issued Mar. 9, 1976. Suitable mounting for the rotary ceramic heat exchanger wheel is disclosed and claimed in United States patent to Phillips, U.S. Pat. No. 3,978,913, issued Sept. 7, 1976.

The heat exchange assembly has a hot air inlet conduit 48 which is connected to the exhaust conduit 34 through branch line 35. The heat exchange assembly 40 also has a hot gas exhaust outlet conduit 50 which is connected to the intake of an exhaust fan 56. An exhaust line 58 having a control valve 60, preferably pressure operated, is connected to the outlet of the exhaust fan 56. This exhaust line 58 typically is exhausted to the atmosphere. The exhaust outlet conduit 50 is in communication with the hot inlet conduit 48 through the rotary ceramic heat exchanger wheel 42. Preferably, the exhaust line 58 is connected to the exhaust conduit 34 through a conduit 59 in order to maintain a proper back pressure therein. The back pressure is necessary to avoid drawing excess air in through furnace entrance 14.

A heated air exhaust conduit 54 is provided in the heat exchange assembly 40 and connects directly with the heated air supply conduit for the burners 18. The heated air exhaust conduit 54 is in communication with a cold air inlet conduit 52 through the rotary ceramic heat exchanger wheel 42. A cold air fan 62 supplies air under pressure to the cold air inlet conduit 52 through cold air supply line 64. A control valve 66 is provided in the cold air supply line 64 to control the flow of air therethrough.

A thermocouple 70 is provided in the furnace to detect the temperature at one position within the furnace. The thermocouple 70 is connected to a temperature controller 72 through a control line 74. The temperature controller 72 in turn is connected to the control valve 66 through control line 78 and to the control valve 26 through the control line 76. The temperature controller controls the flow of air through the cold air supply line 64 and the flow of fuel through the fuel supply line 24 so as to maintain the temperature in the furnace between predetermined limits.

A second thermocouple 80 is provided in the hot inlet conduit 48 to detect the temperature therein. The thermocouple 80 is connected to a temperature controller 84 through control line 82. The temperature controller 84 controls the damper valve 38 to maintain the temperature of the gases in the inlet conduit 48 between predetermined limits. For example, if the temperature of the gases in the inlet conduit 48 rises above a predetermined level, then the temperature controller 84 will open the damper valve 38 so as to allow more cooler air to pass through the air inlet pipe 36, thereby cooling the gases supplied to the hot air inlet conduit 48. Conversely, if the gases in the hot inlet conduit 48 fall below a predetermined limit as detected by the termocouple 80, then the temperature controller 84 will close the damper valve 38 to decrease the flow of cooler air into the exhaust conduit 34.

In the event that the temperature in the furnace changes due to idling or other causes, the flow of air to the heat exchanger unit through line 64 and thus the flow of air to the burners 18 changes to increase or decrease the amount of heat supplied to the furnace. This change in air flow normally would result in differences in the ratio of gas flow through the opposite sides of the heat exchanger. Thus, for example, if the flow of air through the cold air inlet conduit 52 is decreased significantly, considerably less heat is removed from the exhaust gases by the rotary ceramic heat exchanger wheel 42 and therefore the heat exchanger wheel 42 experiences much higher thermal stresses. The higher thermal stresses deleteriously affect the life of the ceramic wheel and can eventually cause failure of the wheel.

According to the invention, the flow of gases through both sides of the ceramic heat exchanger wheel is controlled to maintain the ratio of flow at a predetermined value. To this end, a ratio controller 86 is provided to control the flow of gases through the heat exchanger wheel 42 between the hot inlet conduit 48 and the exhaust outlet conduit 50 by controlling the gas flow through the control valve 60. The ratio controller 86 comprises a housing 88 having a first chamber 89 separated by a diaphragm 90 and a second chamber 91 separated by a diaphragm 94. A smaller diaphragm 92 separates the first chamber 89 from the second chamber 91 and a smaller diaphragm 96 is provided at the bottom of the housing 88. The first diaphragm 90 is connected to the housing through a tension spring 98 and all of the diaphragms are coupled together through couplings 100, 102 and 104. The tension spring can be adjusted to change the equilibrium flow ratio slightly, but typically the tension spring is sufficient only to support the weight of the diaphragm so that the pressure drop across the two sides of the wheel is balanced at equilibrium. A port 106 in the hot inlet conduit 48 is pneumatically connected to the upper portion of the second chamber 91 through pressure line 108. A port 110 in the exhaust outlet conduit 50 is connected to the lower portion of the second chamber in housing 88 through pressure line 112. In similar manner, port 114 is connected to the upper part of the first chamber 89 in housing 88 through pressure line 116. Port 118 connects the cold air inlet conduit 52 to the lower portion of the first chamber 88 in the housing 88 through pressure line 120.

Thus, the pressure drop across the wheel 42 between conduits 48 and 50 is detected in the second chamber 91 of housing 88 and this pressure differential is applied as a downward force on the diaphragm 94. In like manner, the pressure drop across the ceramic heat exchanger wheel 42 between conduits 52 and 54 is detected in the first chamber of the housing 88 and applied as an upward force on the diaphragm 90. Spring 98 serves to support the diaphragm assembly but can be used to slightly adjust the flow ratio across the wheel. For example, if it is desirable to have a higher flow across the wheel 42 between conduits 52 and 54, then the tension in spring 98 is decreased which would tend to load the diaphragm assembly. Thus it would take a greater pressure drop across the wheel between conduits 52 and 54 to maintain an equilibrium position of the ratio controller 86. A greater pressure drop between conduits 52 and 54 would mean a greater flow rate across the ceramic heat exchanger wheel 42 between conduits 52 and 54.

A regulated pressure line 122 having flow regulators 124 and 126 have a valve opening 128 and a movable valve element 130 therein. The movable valve element 130 is connected to the diaphragm 96 so as to move with the four diaphragms in the ratio controller 86. The air pressure in the regulated pressure line 122 downstream from the valve opening 128 is detected by a pressure controller 136 which in turn controls a valve 134 to control the flow of air between lines 132 and 144. The controller 136 is a conventional controller having a hollow chamber with a diaphragm 138 defining a sealed bottom compartment. A tension spring 140 supports the weight of the diaphragm such that the valve 134 is closed when the pressure in the bottom chamber of 36 is at atmospheric pressure. Pressure in the bottom chamber of the valve 136 is provided by the pressure control line 142. The diaphragm 138 is connected to a valve operating member 146 which controls the flow through the valve 134. The pressure line 144 is connected to the control valve 60 to control the flow therethrough in accordance with the pressure in line 144. The control valve 60 is responsive to the pressure in line 144 such that increased pressure in line 144 will decrease flow through the valve 60 whereas decrease in pressure in line 144 will increase flow through valve 60.

In operation, the heated exhaust from the furnace is heat exchanged with the make-up air in the rotary ceramic heat exchange assembly 40. Under normal conditions, the flow through both sides of the heat exchanger wheel 42 will be balanced at a ratio of about 1:1 although this ratio can be increased or decreased depending on process conditions. Under balanced conditions, ratio controller 86, controller 136 and control valve 60 will be stable and at an equilibrium point.

In the event that the furnace is operating under a reduced flow condition, the temperature in the furnace will increase, thereby causing the temperature controller 72 to close down the flow of air through line 64 and the flow of fuel through line 24. This decreased flow between conduits 52 and 54 will cause a smaller pressure drop across the ceramic heat exchanger wheel 42 between conduits 52 and 54. The decreased pressure drop will result in a raising of the diaphragm 90, resulting in a closing of the valve element 130 in the valve opening 138. The decreased flow through the valve opening 128 results in a lower pressure downstream thereof. This lower pressure is sensed by the lower chamber in the pressure controller 136 which will result in a downward movement of the diaphragm 138. The coupling 146 will move downwardly with the diaphragm 138 to close down the valve 134, thereby decreasing the pressure in line 144. The pressure operated valve 60 responds to the decreased pressure in line 144 to close down the flow of gases through the valve 60, thereby decreasing the flow across the ceramic heat exchanger wheel 42 between the conduits 48 and 50. This difference in pressure is detected by diaphragm 94 which will thereafter adjust the position of valve 130 so that a proper pressure balance is once again maintained across the heat exchanger wheel in the two separate flow systems.

A corresponding increase in flow through the heat exchanger wheel 42 between conduits 52 and 54 will result in an opposite pressure imbalance in the ratio controller 86 and thereby cause an opposite reaction to increase the flow through the pressure control valve 60.

Thus, the invention provides a system for regulating the flow through both sides of the heat exchanger wheel so as to maintain the flow rate at a predetermined ratio. Typically, the flow rate is maintained about equal with a slightly higher flow, however, between conduits 48 and 50 than the flow between conduits 52 and 54. The balanced flow through the different sides of the heat exchanger wheel avoids undue thermal stresses on the wheel and maximizes efficiency of the operation.

Whereas the invention has been described with reference to pneumatic controls and pneumatically controlled valves, the invention can be carried out with electrical controllers and electrically controlled valves. Further, other pneumatic valve arrangements can be made to give broader adjustability to the ratio of gas flow across the two sides of the wheel. For example, multiple regulator valves, similar to valve 86, can be used to provide for improved adjustability of the ratios.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. In an industrial heating furnace comprising:
    means for supplying heated air to the furnace for heating articles therein;
    means for removing heated exhaust gases from the furnace;
    a rotary ceramic heat exchanger means for heat exchanging the heated exhaust gases with air;
    means for passing the heated exhaust gases through a first side of the rotary ceramic heat exchanger means;
    means for passing air through a second side of the rotary ceramic heat exchanger means;
    means for passing the heated air from the second side of the rotary ceramic heat exchanger means to the furnace for heating articles therein; and
    means for maintaining the temperature of the gases within the furnace within predetermined limits including means for controlling the flow of air through the second side of the rotary ceramic heat exchanger means to the furnace;
    the improvement which comprises:
    means for maintaining the ratio of the flow of gases through the first side of the rotary heat exchanger to the flow of gases through the second side of the rotary heat exchanger means at a predetermined value, said maintaining means including means for measuring the flow rate of gases through each side of the rotary ceramic heat exchanger means and means, independent of the air flow control means, for controlling the flow of heated exhaust gases through the first side of the rotary ceramic heat exchanger means to maintian the ratio at the predetermined value.

2. An industrial heating furnace according to claim 1 wherein the flow rate measuring means further comprises:
    means for detecting the pressure drop across the first side of the rotary heat exchanger means; and
    means for detecting the pressure drop across the second side of the rotary heat exchanger means.

3. An industrial heating furnace according to claim 2 and further comprising means for adjusting the ratio which is maintained by the ratio maintaining means.

4. An industrial heating furnace according to claim 3 and further comprising at least one burner in the furnace and means for supplying at least a portion of the heated air to the burner as combustion air.

5. An industrial heating furnace according to claim 1 and further comprising means for adjusting the ratio which is maintained by the ratio maintaining means.

6. An industrial heating furnace according to claim 1 and further comprising at least one burner in the furnace and means for supplying at least a portion of the heated air to the burner as combustion air.

7. An industrial heating furnace according to claim 1 wherein the heated exhaust gases passing means includes a branch conduit for passing only a first portion of the exhaust gases through the rotary ceramic heat exchanger leaving a second portion thereof; and further comprising means downstream of the rotary ceramic heat exchanger wheel for recombining the first portion of the exhaust gases with the second portion thereof after the first portion has passed through the heat exchanger wheel to maintain the back pressure in the furnace.

8. In a method of heating articles in an industrial heating zone comprising:
supplying heated gases to the heating zone;
removing heated exhaust gases from the heating zone and passing at least a portion of the heated gases through a first side of a rotary ceramic heat exchanger wheel to strip heat therefrom;
passing air through a second side of the rotary ceramic heat exchanger wheel to heat the air;
passing the air, thus heated, to the heating zone for heating the articles therein; and
controlling the temperature of the gases in the heating zone at least in part by controlling the flow of air through the second side of the rotary heat exchanger wheel and to the furnace to maintain the temperature within a predetermined range of temperatures;
the improvement which comprises:
maintaining the ratio of the flow of gases across the first side of the rotary heat exchanger wheel to the flow of gases across the second side of the rotary heat exchanger wheel at a predetermined value by measuring the flow of gases across the first and second sides of the rotary ceramic heat exchanger wheel and controlling the flow of gases across the first side of the rotary ceramic heat exchanger wheel independent of the control of the flow of gases across the second side of the rotary heat exchanger wheel to maintain the ratio at the predetermined value.

9. A method for heating articles according to claim 8 wherein the measuring step comprises:
measuring the pressure drop across the first side of the heat exchanger wheel;
measuring the pressure drop across the second side of the heat exchanger wheel;
the step of controlling the flow of gases across the first side of the rotary ceramic heat exchanger wheel includes computing the ratio of the measured pressure drops across the first and second sides of the heat exchanger wheel.

10. A method for heating articles according to claim 9 wherein the flow of gases through the first side of the heat exchanger wheel is controlled responsive to the computed ratio.

11. A method for heating articles according to claim 8 wherein the ratio is maintained at about one.

12. A method for heating articles according to claim 8 wherein the heating zone contains at least one burner for combusting fuel with air and at least a portion of the heated air is passed to the burner as combustion air.

13. A method of heating articles according to claim 8 wherein only a portion of the exhaust gases are passed through the rotary heat exchanger wheel, and the heat stripped gases are recombined with the remaining portion of the exhaust gases after passsing through the heat exchanger wheel to maintain back pressure in the industrial heating zone.

* * * * *